US010297011B2

(12) United States Patent
Dirik et al.

(10) Patent No.: US 10,297,011 B2
(45) Date of Patent: May 21, 2019

(54) ANONYMIZATION SYSTEM AND METHOD FOR DIGITAL IMAGES

(71) Applicants: Ahmet Emir Dirik, Bursa (TR); ULUDAG UNIVERSITESI TTO, Bursa (TR); Ahmet Karakucuk, Bursa (TR)

(72) Inventors: Ahmet Emir Dirik, Bursa (TR); Ahmet Karakucuk, Bursa (TR)

(73) Assignees: Ahmet Emir Dirik, Bursa (TR); ULUDAG UNIVERSITESI TTO, Bursa (TR); Ahmet Karakucuk, Bursa (TR)

( * ) Notice: Subject to any disclaimer, the term of this patent is extended or adjusted under 35 U.S.C. 154(b) by 531 days.

(21) Appl. No.: 14/782,127

(22) PCT Filed: Apr. 7, 2014

(86) PCT No.: PCT/TR2014/000104
§ 371 (c)(1),
(2) Date: Jun. 6, 2017

(87) PCT Pub. No.: WO2014/163597
PCT Pub. Date: Oct. 9, 2014

(65) Prior Publication Data
US 2018/0240216 A1 Aug. 23, 2018

(30) Foreign Application Priority Data

Apr. 5, 2013 (TR) .................... 2013/04116

(51) Int. Cl.
*G06K 9/40* (2006.01)
*G06T 5/00* (2006.01)
(Continued)

(52) U.S. Cl.
CPC .............. *G06T 5/002* (2013.01); *G06F 17/15* (2013.01); *G06F 21/6254* (2013.01);
(Continued)

(58) Field of Classification Search
None
See application file for complete search history.

(56) References Cited

U.S. PATENT DOCUMENTS

2002/0158192 A1* 10/2002 Gann .................. G01N 21/94
  250/234
2012/0195476 A1* 8/2012 Bayram ............ G06F 17/30799
  382/124
2016/0028974 A1* 1/2016 Guidash ............. H04N 5/37455
  348/294

FOREIGN PATENT DOCUMENTS

FR          503745 A     6/1920
WO    2007018478 A2     2/2007

OTHER PUBLICATIONS

Rosenfeld et al. "A Study of the Robustness of PRNU-based Camera Identification", SPIE Conference on Media Forensics and Security, 2009. 191 Dmitry Rublev, Vladimir Fedorov, and Oleg Makarevich. Digital.*

(Continued)

*Primary Examiner* — Randolph I Chu
(74) *Attorney, Agent, or Firm* — Egbert, McDaniel & Swartz, PLLC

(57) ABSTRACT

Disclosed is a method of anonymization of digital images through elimination of the Photo-Response Non Uniformity noise pattern which is unique to the imaging sensor and latent in all digital images taken by digital cameras or devices with imaging sensors.

15 Claims, 3 Drawing Sheets

(51) Int. Cl.
G06K 9/00 (2006.01)
G06F 17/15 (2006.01)
G06F 21/62 (2013.01)

(52) U.S. Cl.
CPC ........... *G06K 9/00577* (2013.01); *G06K 9/40* (2013.01); *G06T 2207/20182* (2013.01)

(56) References Cited

OTHER PUBLICATIONS

International Search Report for corresponding International Application No. PCT/TR2014/00010.

* cited by examiner

ANONYMIZATION SYSTEM AND METHOD FOR DIGITAL IMAGES

TECHNICAL FIELD

This invention relates to an anonymization system and method that eliminates PRNU noise so that PRNU noise cannot be used to identify source camera device. PRNU noise is latent in all digital images captured by digital cameras and/or digital devices with camera capability.

PRIOR ART

There are several noise components inflicted upon digital images during image acquisition through the imaging pipeline. A particular noise component called PRNU (Photo Response Non-Uniformity) forms a unique and characteristic noise pattern of the particular imaging sensor that captures the image, and it is latent in all digital images taken by any digital imaging sensor.

The use of PRNU noise to determine the source (origin) device of an image has first been described in the patent document U.S. Pat. No. 7,787,030 (B2). For the identification of the source (origin) device of an image, some digital images, which are known to be captured by the particular source device, are first used to acquire the characteristic PRNU noise (camera PRNU fingerprint) of the digital imaging sensor. Later, PRNU noise of a test image, which comes from an unknown origin, will be searched from a PRNU database to determine the unknown source device. If this search results a positive match, then it is said that the test image is captured by the matched camera device.

PRNU noise, in general, degrades the quality of images, hence the effect caused by the PRNU noise is undesirable. PRNU noise does not change in time and varies with the level of light intensity reached out to the sensor during the capture of an image, which makes it quite robust against various types of image manipulations such as compression, resizing, noise filtering, noise suppression, cropping, etc. In addition, the existence of PRNU noise on the image, hinders privacy, when it is required to be preserved, There are various techniques exist that are known to be effective on weakening the PRNU noise. U.S. Pat. No. 7,443,431 (B2) discloses a method called "flat-fielding" to weaken the sensor noise caused by sensor temperature. The method, briefly, requires special photograph shoots, made in a completely dark environment and in a homogenously lit environment, of a flat surface. The dark and flat frames are then used to flat-field a given image. The flat-fielded image is then assumed to be weakened by sensor noise. However, the method relates to removal of temperature-dependent types of sensor noise in digital images, thus, PRNU noise can only be slightly weakened by flat-fielding. Because PRNU noise is dependent to the light intensity reaching to the imaging sensor. Furthermore, the application of flat-fielding requires appropriate photo shooting conditions as mentioned above, for capturing the dark and flat frames, which requires expertise and additional hardwares for shooting. In addition, physical access to the source device is needed in order to capture special frames. Hence, the previous method can not eliminate PRNU noise completely, and the correct application of the method requires special image captures. In addition, the ideal application of the method also requires RAW (not interpolated) outputs, which is a feature that is not available in many consumer cameras (consumer cameras generally provide interpolated output in JPG format). Therefore, the disadvantages restricts the applicability of the previously disclosed method.

In U.S. Pat. No. 7,391,447 (B2), a method which solves the dark capture requirement of the previous method is disclosed for removal of image noise. However, this method also specifically aims removal of the temperature-based sensor noise not the PRNU noise. Additionally, the method uses multiple captures of the same scene with the same camera, which requires expertise and therefore is not practical for the consumer. Furthermore, the physical access to the source device is also needed to remove the temperature-based sensor noise. However, the temperature-based sensor noise covers only a small fraction of PRNU, because PRNU varies solely with the amount of light intensity reaching to the camera sensor.

Thus, an innovation is necessary to overcome above-mentioned drawbacks of the related technical field.

SHORT DESCRIPTION OF THE INVENTION

The presented invention relates to a system and method developed for source device anonymization of digital images, which overcomes several disadvantages of the prior art and provides several advantages to the related technical field.

Main purpose of the invention is to provide a source device anonymization system and method to impede PRNU based source device identification, by elimination of the PRNU noise which is latent in all digital images taken by any type of digital imaging sensors.

Another purpose of the invention is to provide PRNU noise elimination method and system for images on camera featuring devices and image sharing devices or systems.

Another purpose of the invention is to provide a system and method for anonymization of a digital image, without any physical access requirement to the camera or to the camera featuring device that captured the digital image.

Another purpose of the invention is to present a system and a method for practical and user-friendly anonymization of digital images, which does not require any special image shoots, environments, hardwares or expertise.

According to the previous explanations to the extent that fulfill all the purposes that would arise with the detailed explanations below, the present invention relates to the elimination of PRNU noise, a noise type that is latent in all images captured by digital imaging sensors and characteristic to the source imaging sensor that took the image. After elimination, the utilization of PRNU noise for the purpose of source camera identification can no longer be possible; hence the processed images become anonymized. The method consists of the following processing steps:
  a. Selecting a test image that is requested to be anonymized,
  b. Determining at least one reference image that is captured with the same digital imaging sensor,
  c. Computing camera PRNU fingerprint estimate of the imaging sensor using the reference image,
  d. Estimating PRNU noise latent in the test image,
  e. Estimating PRNU noise power factor of the test image, by computing the correlation of the PRNU noise of the test image, and camera PRNU fingerprint estimate of the imaging sensor acquired using reference image/s,
  f. Eliminating PRNU noise of the test image, by subtracting the multiplication of the estimated PRNU noise power factor with the estimated sensor noise from the test image.

The method can be applied to devices with camera features, in the form of a PRNU estimation and elimination unit, integrated into the digital imaging sensor output. Similarly, on the image sharing devices or systems, the applicability of the present invention is provided by integration of PRNU estimation and elimination unit to the input of image transmitter circuit.

The method can be used by/for,

News agencies (Reuter, AP, etc.), to hide the source device of photography/video content to be published and to prevent the ability to associate and/or correlate published content with the new content, any of which is digitally transferred over telecommunication channels, Anonymization of visual medical records, Impeding the ability to determine and associate the identity of medical institutions from released visual medical records, Intelligence agencies, for hiding the source device that produced the visual content, and for impeding the ability to associate and/or cluster the common source of digital images/videos (such as a recording of a criminal activitiy) during the data transfer over an unsecured digital telecommunication channel, Military organizations, for hiding the source of a sensitive visual content (e.g. a particular camera featuring vehicle, such as a reconnaissance plane), during or after the transfer of digital images/videos, that are captured with the camera featuring vehicle, which are transferred over/to an unsecured medium, such as a telecommunication channel or television publication, and to impede the ability to associate and/or cluster the common source (such as a particular camera featuring vehicle) of critically important visual contents (as of digital images/videos e.g. an aerial view of a target or interest), Internet broadcasters, to hide the source and to prevent the ability to associate, correlate, or cluster the common source of the content which are transferred with digital telecommunication channels, Social media platforms, to hide the source of photography/video content used, recorded and/or published and/or shared by the customers, to preserve privacy of the customers, and to impede the ability to associate and/or cluster the common source (such as a particular customer) from used, recorded and/or published and/or shared photography/video content, Television networks and print media, to hide the source of visual content and to prevent the ability to associate, correlate, and/or cluster the released content down to a common source.

Embodiment of the present invention and accompanying advantages occurred with the additional elements should be evaluated together with the following drawings and their respective descriptions.

DESCRIPTION OF THE FIGURES

In drawing 1, a schematic view of the present invention with regards to the anonymization method is presented.

In drawing 2, a flow chart diagram of the present invention regarding to the anonymization method is presented.

Figure 1:
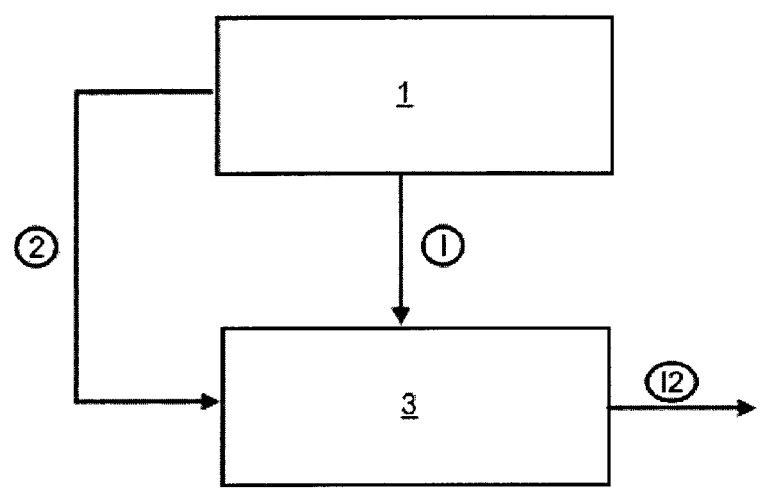
Figure 2:
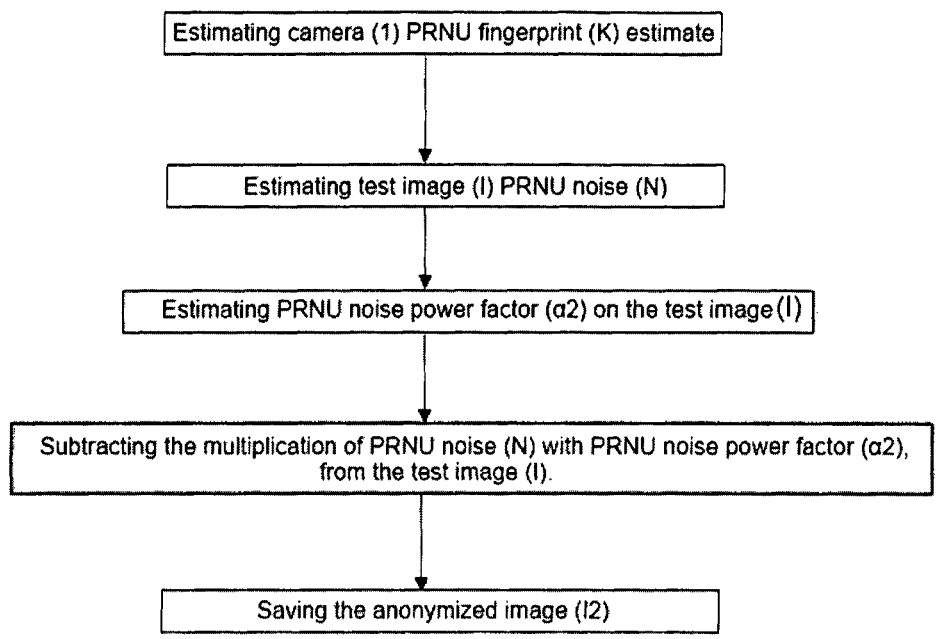
Figure 3:
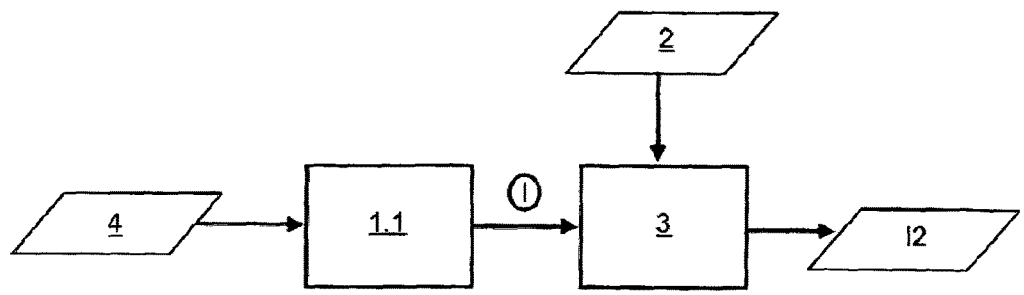
Figure 4:
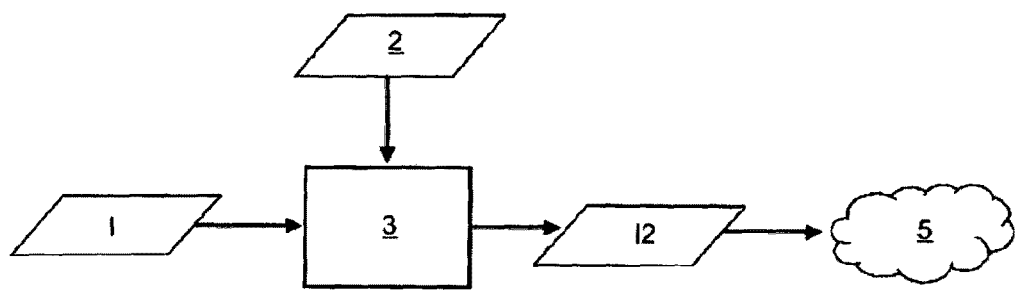

Drawing 3, is a schematic view of an alternative embodiment of the present invention regarding with the anonymization method.

Drawing 4, is a schematic diagram of an additional alternative embodiment of the present invention of the anonymization system.

REFERENCE NUMBERS

1 Digital imaging sensor
2 Reference image
3 PRNU fingerprint estimation and elimination unit
4 Image
5 Internet
PRNU: Photo Response Non-Uniformity
PCE: Peak to Correlation Energy Ratio
I: Test image
I2: Anonymized image
K: camera PRNU fingerprint estimate
N: PRNU noise estimate of the test image
$\alpha 2$: Power factor of PRNU noise on the test image

DETAILED DESCRIPTION OF THE INVENTION

In this detailed description, the present invention is described only to serve to a better understanding of the subject, without imposing any limiting effect to the present invention. To this extend, the following descriptions and drawings disclose a system and method for elimination of PRNU noise, a noise type that is latent in all images captured by digital imaging sensors and characteristic to the source imaging sensor that took the image. The utilization of PRNU noise for the purpose of source camera identification can no longer be possible after elimination; hence the processed images become anonymized Drawing 1, is a schematic view of the PRNU fingerprint estimation and elimination unit (3). Here, at least one reference image (2) and a test image (I) are provided as inputs of this unit (3).

Reference image (2) is the term of an image which is created by a digital imaging sensor (1) at any time and recorded to a certain medium. Reference image (2) can be acquired from the internal or the external memory of a camera or a device with digital imaging sensor (1) or it can be acquired on a medium that can be accessed through a telecommunication channel. Test image (I) is the term of an image that is captured with the same digital imaging sensor (1) that has captured the reference image (2). Test image (I) is requested to be anonymized, by the elimination of PRNU noise on the test image (I).

According to the the system disclosed with the present invention, the process of PRNU noise elimination of a test image (I) is as follows: Initially, the camera PRNU fingerprint (K) of the source digital imaging sensor (1), is estimated. For the estimation of camera PRNU fingerprint (K) at least one reference image (2), which is captured by the same source digital imaging sensor (1), is used. To this extend, camera PRNU fingerprint estimate (K) is estimated by extraction of PRNU noise from the reference image (2), followed by pixel-by-pixel averaging of the extracted PRNU noise. In the estimation, increasing the number of reference images (2) also increases the quality of camera PRNU fingerprint estimate (K). However, one reference image (2) is enough for computing a camera PRNU fingerprint estimate (K) for the anonymization of test image (I) which will be explained later in detail. The camera PRNU fingerprint estimate (K) is a characteristic trace of the digital imaging sensor (1) that took the reference image (2). After the computation of the camera PRNU fingerprint estimate, PRNU noise (N) of the test image (I) is estimated by a 2 dimensional de-noising filter. According to the literature of signal processing, de-noising filters are used to estimate the difference between the noisy input signal and the prediction of the noise-free model of the signal. Thus, PRNU noise (N) of the test image (I) is estimated by de-noising filtering of the test image (I), and subtracting the filtered image from the test image (I). However, subtracting the PRNU noise estimate (N) from the test image (I) would not produce PRNU noise-free images; because PRNU noise (N) spreads within all frequency components of digital images and the lack of an ideal de-noising filter that specifically filters PRNU noise. To overcome this problem, the present invention of PRNU noise elimination system does estimate PRNU noise (N) of the test image (I), along with the PRNU noise power factor ($\alpha 2$). To this extent, for the anonymization of the test image (I), the following equation is used.

$$I2 = I - \alpha 2 \times N \qquad (1)$$

In the equation above, the camera PRNU fingerprint estimate (K), which was acquired from reference image (2) is not used. Instead, PRNU noise estimate (N) of the test image (I) is used. Because, camera PRNU fingerprint estimate (K) depends to the number of images used in its estimation. In the equation, if the camera PRNU fingerprint estimate (K) were to be used, the anonymized version of the test image (I2) would only be anonymized for a particular camera PRNU fingerprint estimate (K) and, the anonymization of the test image (I) would fail against a better-estimated camera PRNU fingerprint estimate (K) formed by many reference images (2). In the present invention, the PRNU noise estimate (N) of the test image (I) itself is used to produce anonymized version of the test image (I2), so that the source digital imaging sensor (1) of an anonymized image (I2) would not be identified in the case of an source identification attempt, using a higher-quality camera PRNU fingerprint estimate (K), is made.

In the equation number 1 above, PRNU noise power factor ($\alpha 2$) of a test image (I) is determined through the following process: An interval is chosen for searching the value of $\alpha 2$, and for each value of $\alpha 2$, a version of the test image (I2) is produced. From each of these images (I2), an estimation of PRNU noise $N2(\alpha)$ is computed. The correlation between the camera PRNU fingerprint estimate (K) and PRNU noise estimate $N2(\alpha)$ is used to compute PRNU noise power factor ($\alpha 2$) with the equation given below.

$$\alpha 2 = arg_\alpha \min PCE\{K, N2(\alpha)\} \qquad (2)$$

In the above equation, PRNU noise power factor ($\alpha 2$) is determined by comparing the camera PRNU fingerprint estimate (K) and the estimated PRNU noise $N2(\alpha)$ using Peak to Correlation Energy (PCE) function is used to compute a scalar value from the normalized correlation between the camera PRNU fingerprint estimate and the PRNU noise ($N2(\alpha)$). A successful anonymization is determined by convergence of the correlation between the PRNU noise ($N2(\alpha)$) and the camera PRNU fingerprint estimate (K) to zero. Hence, the value of PRNU noise power factor ($\alpha$), which yields the lowest-possible value of PCE is determined as "$\alpha 2$". The mentioned process is executed iteratively, and the most appropriate value of PRNU noise power factor ($\alpha 2$) is computed with the above-mentioned equation. PCE value is a correlation measure, which indicates the ratio between the position of the peak value of the 2-dimensional normalized correlation, to the average of the remaining normalized correlation values. Therefore, tracking PCE as the correlation measure during the estimation of PRNU noise power factor ($\alpha 2$), enables better PRNU noise (N) elimination on the test image (I) than the classical de-noising algorithms.

It is also possible to use different statistical operators, other than PCE function, for computing the correlation between the camera PRNU fingerprint estimate (K) and PRNU noise ($N2(\alpha)$) for the estimation of PRNU noise power factor ($\alpha 2$).

With the explanations above, the steps for elimination of PRNU noise (N) of a test image (I) thus anonymization of the test image (I) are as follows:
  Estimation of the camera PRNU fingerprint (K), with at least one reference image (2) acquired from the same digital imaging sensor that took the test image (I).
  Extraction of PRNU noise (N) from the test image (I).
  Computation of PRNU noise power factor ($\alpha 2$) of the test image (I), from the correlation between the camera PRNU fingerprint estimate (K), which is computed from at least one reference image (2), and PRNU noise (N), which is extracted from the test image (I).
  Elimination of PRNU noise (N) of the test image (I), by subtracting the multiplication of PRNU noise (N) with PRNU noise power factor ($\alpha 2$), from the test image (I).
  Saving the anonymized image (I2).

In drawing 3, PRNU noise estimation and elimination method of the present invention regarding the application for the camera featuring devices are given with a schematic diagram. The camera featuring device is the term that describes any device with necessary optical/electronic components, and produces digital images. Among such devices are digital cameras, DSLR cameras, cellphones, smartphones, camera integrated monitors, computers, tablets, tablet computers, security cameras, etc. To this extent, digital still images or moving images are captured through the digital imaging sensor (1) of the device and converted to an appropriate format (such as, jpg, raw, avi, mp4, mpg, qt, etc). The acquired images (I) are then transferred from the output of the digital imaging sensor (1) to the input of PRNU noise estimation and elimination unit (3). In this unit, PRNU noise (N) of the digital image (I) is eliminated to near-zero level and saved as the anonymized image (I2) so that any possible utilization of PRNU noise for the purpose of source device identification from an anonymized image (I2) is diminished. During this process, reference images (2) captured by the same camera or the same camera featuring device (1) are acquired from the device memory and/or storage unit.

On the camera featuring devices that are integrated with PRNU noise estimation and elimination unit (3), the user determines whether or not the captured images are to be anonymized during the usage via device interface. Thus, anonymization is applied to each of the captured images automatically or to particular images, which are determined by the user.

Drawing 4, depicts a schematic view for the application of PRNU noise estimation and elimination unit (3) to image sharing devices or systems. In devices such as cameras that can upload and share images or videos (including smartphones, or cellphones, etc.) to social networks or remote locations over computer networks, integration of PRNU noise estimation and elimination unit (3) to the input of the image transfer module provides anonymization of images that are chosen to be shared. Furthermore, PRNU noise estimation and elimination unit (3) can be integrated to the software system or to the data transfer circuit used in image sharing web sites and other social sharing activity platforms, such as YouTube, Flickr, Tumblr, Facebook, Twitter, etc. For these applications, image sharing process is described as following: User is prompted via a device interface for the anonymization of the images that he/she is about to share.

The user either selects automatic anonymization of images are being shared during the user session, or selects from the interface to choose and decide which images are to be anonymized, one by one. Images that are selected by the user are processed by PRNU noise estimation and elimination unit (3), which accesses and processes the reference images (2) from a predetermined storage medium which stores not-anonymized images captured by the same source camera or by the same camera featuring device as with the anonymization-requested images. Hence, to acquire reference images (2) PRNU noise estimation and elimination unit (3) does not require physical access to the source camera or camera featuring device, so that the predetermined storage medium can be on a shared location, accessed over a communication network on a memory card, on a flash drive, or on a USB stick. Reference images (2) are processed, and PRNU noise (N) of the test image (I), which is is requested to be anonymized, is eliminated and the anonymized image (4) is produced. The produced image (4) is saved on the sharing device and transferred over a telecommunication channel to the internet (5).

The disclosed system and method relates to anonymization of an image (I). The image (I) herein, can be an image which consists of different color channels, in this case, the anonymization is process on each of these color channels, and as a result, PRNU noise on the image (I) is eliminated. For example, if the image (I) is of RGB format, anonymization is applied for R, G and B color channels of the image (I), separately. Elaboratly, R, G, and B color channels of the image (I) are separated and anonymization method is applied on each of these separate channels. Alternatively, R, G, B image can be converted to grayscale and the anonymization process may be applied on this grayscale converted image (I). If the image is of grayscale origin, the anonymization process is applied as if the image consists of a single channel, and PRNU noise (N) is eliminated. Hence, the disclosed invention depicts a system and method that can be applied on images (I) with any color composition.

A PRNU fingerprint and noise removal method, similar to removal of watermark signals, is previously proposed by Lukâs, et. al. (J. Lukâs, J. Fridrich, and M. Goljan, "Digital camera identification from sensor pattern noise," IEEE Transactions on Information Forensics Sec. 1, 205-214, 2006). In this work, Lukâs, et. al. proposes subtracting the camera PRNU fingerprint estimate (K), which is multiplied with a constant, from the image (I). Consequently, Li, et. al (Li, Chang-Tsun, Chih-Yuan Chang, and Yue Li. "On the repudiability of device identification and image integrity verification using sensor pattern noise." Information Security and Digital Forensics. Springer Berlin Heidelberg, 2010. 19-25.) has experimented with the approach proposed by Lukâs, et. al., and found that it is possible to weaken the camera PRNU fingerprint estimate so that anonymization can be achieved. This previously proposed method uses $I2=I-\alpha2 \times K$ equation. According to this, the camera PRNU fingerprint estimate (K) is multiplied by a constant ($\alpha2$), and then subtracted from the image. However, if a higher quality camera PRNU fingerprint estimate, such as (K2), is available, this method would not be able to impede identification of the source device.

In this disclosed invention, the approach is different than the previously proposed method made in 2006 and experimented in 2010. In the disclosed method and system, the anonymization is not achived by subtraction of the camera PRNU fingerprint (K) multiplied with a constant ($\alpha2$), from the image; in contrast, the disclosed method and system consists of estimating sensor related noise components (N), from the image (I) itself and multiplication with a constant factor ($\alpha2$), only then subtracted from the image ($I2=I-\alpha2 \times N$ and/or $I2(i)=I(i)-\alpha2(i) \times N(i)$). Hence achiving anonymization is not related with the camera PRNU fingerprint estimate (K) as with the previous method, so that source identification would be impeded even if a higher quality camera PRNU fingerprint estimate (K2) is available to identify the source device. Thus, privacy of the source is preserved with a much higher degree than of the previous methods in the literature.

In this disclosed invention, in other words, the camera PRNU fingerprint (K) is not subtracted from the image (I), but PRNU noise estimate (N) of the image (I) itself is subtracted, after multiplication with PRNU noise power factor ($\alpha2$) so that the disclosed method can precisely measure PRNU noise of the image. With this property, even if the higher quality camera PRNU fingerprint estimate (K2) were to be used for source identification, source of the anonymized images can not be identified. Hence, robust anonymization is achived against attacks, which are aimed to identify the source of the anonymized images, are made with higher quality camera PRNU fingerprint (K2).

In the year 2014, the inventors of the disclosed system and method, Dirik and Karaküçük (A. E. Dirik, A. Karaküçük, Forensic use of photo response non-uniformity of imaging sensors and a counter method, Optics Express, Vol. 22, No. 1, p. 470-481, 2014) has shown that the disclosed method can be successfully applied on images captured with various types of cameras, and, images (I2) that are anonymized using the disclosed method are shown to be robust (in other words, privacy of the source is preserved) against source identification attacks with higher quality camera PRNU fingerprint estimates (K2).

The invention claimed is:

1. A method for anonymizing digital images through elimination of a Photo-Response Non Uniformity (PRNU) noise pattern which is unique to a digital imaging sensor and latent in all digital images taken by digital cameras or devices with digital imaging sensors, the method comprising:

determining a test image to be anonymized;

acquiring at least one reference image that is captured with the same digital imaging sensor used to capture the determined test image;

estimating a camera PRNU fingerprint estimate of the digital imaging sensor using the acquired reference image;

estimating a PRNU noise of the test image;

computing a PRNU noise power factor from a correlation between the PRNU noise estimated from the test image and the camera PRNU fingerprint estimate estimated from the reference image, the step of computing comprising:

determining a search interval for the PRNU noise power factor;

producing a version of the image by subtracting a multiplication of the estimated PRNU noise with PRNU noise power factors in a determined search interval from the test image;

estimating the PRNU noise of the version of the test image produced in the step with a two-dimensional denoising filter;

computing a correlation between the camera PRNU fingerprint estimate and the estimated PRNU noise;

computing a most appropriate PRNU noise power factor which minimizes the previously computed correlation value;

eliminating the PRNU noise in the test image by subtracting a multiplication of the PRNU noise power factor with the PRNU noise from the test image.

2. The method of anonymizing digital images of claim 1, wherein the correlation between the camera PRNU fingerprint estimate and the estimated PRNU noise is computed with a peak-to-correlation energy ratio.

3. The method of anonymizing digital images of claim 2, wherein the PRNU noise power factor is computed by the following equation:

$$\alpha 2 = \arg_\alpha \min \text{PCE}\{K, N2(\alpha)\}.$$

4. The method of anonymizing digital images of claim 1, wherein the step of eliminating the PRNU noise is computed by the following equation:

$$I2 = I - \alpha 2 \times N.$$

5. The method of anonymizing digital images of claim 1, wherein a test image which has of different color channels is anonymized by the steps of estimating the PRNU noise, computing the PRNU noise factor and eliminating the PRNU noise separately for each of the color channels.

6. The method of anonymizing digital images of claim 1, wherein a PRNU estimation and elimination unit is integrated in an output of the digital imaging sensor.

7. The method of anonymizing digital images of claim 6, further comprising:
capturing a still or moving image from any scene and converting the still or moving image into any digital format;
transferring the captured still or moving image to the PRNU estimation and elimination unit;
acquiring previously-captured reference images from a memory or a storage unit of the camera; and
anonymizing the captured still or moving image by eliminating PRNU noise.

8. The method of anonymizing digital images of claim 1, further comprising:
integrating a PRNU estimation and elimination unit to image transfer circuitry of a image sharing device.

9. The method of anonymizing digital images of claim 8, further comprising:
transferring a selected image or images to the PRNU estimation and elimination unit;
accessing reference images by the PRNU estimation and elimination unit;
anonymizing selected images by eliminating PRNU noise; and
sharing the anonymized images over the internet to a sharing medium.

10. The method of anonymizing digital images of claim 9, further comprising:
accessing the reference image from the sharing medium or from a memory card or a local storage medium which was previously used to save images.

11. The method of anonymizing digital images of claim 6, further comprising:
letting a user decide whether to anonymize all of the incoming and/or captured images in a batch or to anonymize a selection of images indicated by the user over a user interface.

12. A method for anonymizing digital images through elimination of Photo-Response Non Uniformity (PRNU) noise with different factors based on regions, the method comprising:
determining a test image to be anonymized;
acquiring at least one reference image that is captured with a digital imaging sensor used to capture the determined test image;
estimating an i.th region of a camera PRNU fingerprint estimate of the i.th region of the digital imaging sensor by using the i.th region of the reference image;
estimating an i.th region of PRNU noise, wherein the i.th region of the test image is divided up into m different regions, wherein each region is assigned a number defined by i. Such that l(i) is the i.th region of the test image, N(i) is the estimated PRNU noise of this region and K(i) is the i.th region of the camera PRNU fingerprint estimate;
computing the i.th value of a PRNU noise power factor from a correlation between the i.th region of PRNU noise estimated from the i.th region of the test image and the i.th region of camera PRNU fingerprint estimate estimated from the i.th region of the reference image, the step of computing the i.th value comprising:
producing a version of the image by subtracting a multiplication of the i.th region of PRNU noise with the i.th value of PRNU noise power factors in the determined search intervals from the i.th region of the test image;
estimating the PRNU noise of all regions of the produced version of the image with a two-dimensional denoising filter;
computing a correlation between the i.th region of the camera PRNU fingerprint estimate and the i.th region of the estimated PRNU noise; and
computing a most appropriate PRNU noise power factor which minimize correlation values; and
eliminating the i.th region of PRNU noise from the i.th region of the test image by subtracting an element-wise multiplication of the i.th value of the PRNU noise power factor with the i.th region of the estimated PRNU noise from the i.th region of the test image.

13. The method of anonymizing digital images of claim 12, wherein the computation between the i.th value of the camera PRNU fingerprint estimate and the i.th region of the estimated PRNU noise is computed with a PCE (Peak to Correlation Energy Ratio) function.

14. The method of anonymizing digital images of claim 13, wherein computation of the i.th value of PRNU noise power factor for the i.th region ($\alpha 2(i)$) is computed by the following equation:

$$\alpha 2(i) = \arg_{\alpha(1)} \min \text{PCE}\{K(i), N2(\alpha(i))\}.$$

15. The method of anonymizing digital images of claim 12, wherein the step of eliminating the i.th region of PRNU noise is computed by the following equation:

$$I2(i) = I(i) - \alpha 2(i) \times N(i).$$

* * * * *